United States Patent Office 2,720,325
Patented Oct. 11, 1955

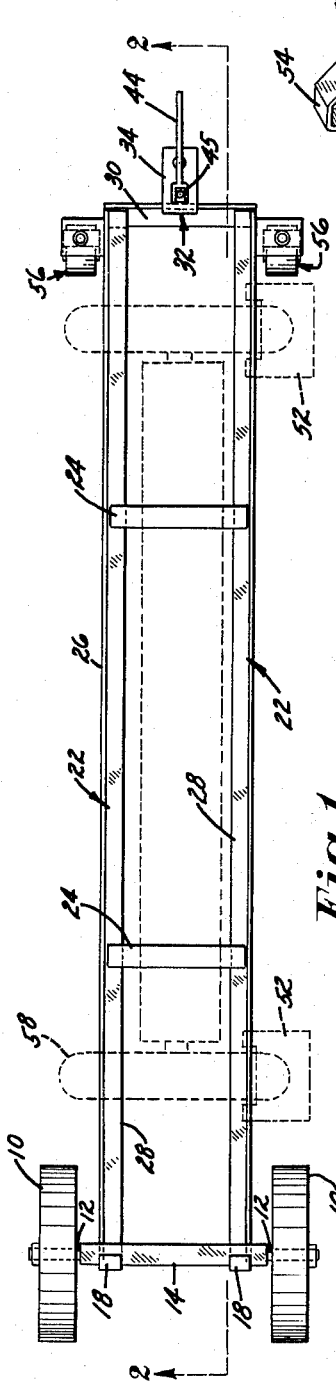
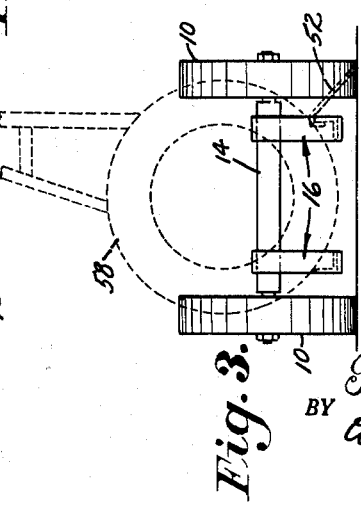
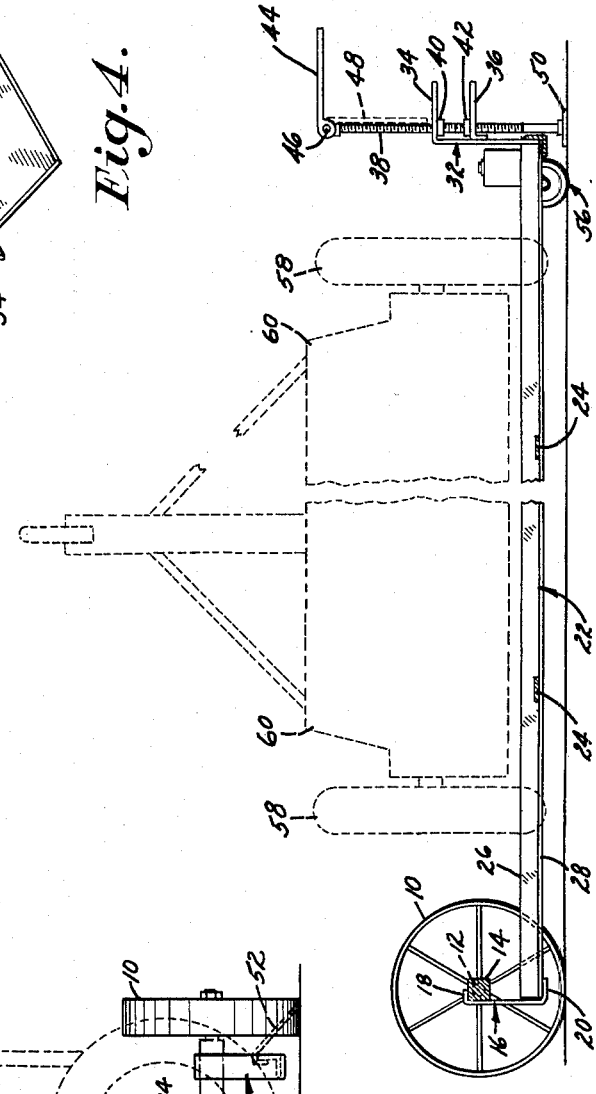

2,720,325
IMPLEMENT CARRYING TRAILER
Reuben Kay, Omaha, Nebr.

Application August 24, 1953, Serial No. 375,886

7 Claims. (Cl. 214—85)

This invention relates to farm implements and in particular it is an object of this invention to provide means for storing broad wheel base farm implements in barns more compactly than heretofore.

In the past, broad wheel base farm implements could only be stored in the barn by moving them through a doorway opening and into storage position on their own wheels. Such movement is of necessity forward or rearward only as the wheels, of course, do not roll in directions transverse to their normal planes of rotation. Consequently, it has been impossible to store broad wheel base farm implements in a compact way.

Additionally, it has been impossible to store a maximum number of farm implements in a barn because of the broad pathway needed for the movement of any one implement into and out of the barn. Other farm implements are usually in the way of the implements desired at any one time whereby the movement of one or more implements is necessary in order to get them out of the way for access to the implement needed.

It is my intention to provide an especially designed vehicle of elongated shape and short wheel base and adapted to be moved endwise whereby farm implements of broad base can be placed with their two outermost wheels to the front and rear of the storage vehicle whereby by moving the storage vehicle forward or rearward the farm implement is thus moved sideways.

Additionally it is my concept to permit the tongue of a farm implement to extend upwardly from the storage vehicle so that a maximum number of farm implements of broad base can be stored in the same building along side each other in parallelism on a plurality of the new storage vehicles.

In the drawings:

Figure 1 is a top plan view of the device showing an implement to be moved in dotted lines.

Figure 2 is a vertical cross section taken along the line 2—2 of Figure 1.

Figure 3 is a rear view taken in the direction of the arrow shown in Figure 2.

Figure 4 is a view of the plate which is attached to a rail of the device to form a track-way for loading the implement.

A pair of wheels 10 of any standard, sturdy construction are mounted on an axle 12. The axle 12 is journaled for rotation in an elongated member 14 which is rectangular or square in cross section as shown in the drawing in Figure 2.

A pair of angle irons 16 are bent at their upper ends to a substantial right angle forming the horizontal portion 18 which hooks over and rests upon the upper surface of the member 14. The lower end of the angle iron 16 is bent at a substantial right angle forming a second horizontal portion 20 which is substantially parallel to the member 18 and extends in the same direction from the member 16. It is to be understood as shown in the drawings that there are a plurality of these angle members and that the member 20 forms a ledge portion.

A plurality of side rail members 22 rest at their ends upon the ledge members 20 and remain removable therefrom or may be attached by any suitable means.

The rail members 22 comprise angle irons having a vertical portion 26 and a horizontal ledge portion 28. The ends of the strap members 24 are welded or otherwise suitably attached or simply laid upon the ledge portion 22 of the side rails. The length of the strap members 24 are substantially equal to the distance between the vertical portions 26 of the side rails and they form a connection therebetween.

As has been said before one end of the rail members rests upon the ledge 20 of the angle iron 16 in the location of the wheels 10. At their opposite ends they are connected together by an end member 30. A vertical rod 32 is welded or otherwise fastened to the end member 30.

The vertical strap member 32 comprises an angle iron which is provided with a substantially horizontal portion 34 welded or otherwise fastened to the vertical portion 32 and at a distance below the horizontal portion 34 is a strap member 36. The members 34 and 36 are each provided with eye openings through which the threaded portion 38 of any conventional jack member may be threadedly inserted.

Bolts 40 and 42 are provided with internal threads adapted to engage the external threads of the member 38 and are positioned beneath and above the strap members 34 and 36 respectively. The upper end of the threaded member 38 is provided with a handle 44 by a pivotal connection 46. The handle member 44 may be collapsed when not in use into the position shown at 48 in dotted lines. The lower end of the member 38 is journaled in a horizontally disposed standard member 50.

The handle 44 is provided at one end with a pair of branched members 45 which pivot at 46 to the upper end of the member 38.

A plate 52 is provided with a plurality of hook portions 54 which are adapted to removably engage the rail members of the vertical portion 28 of a rail member and is adapted for adjustment along its length.

A pair of these plates 52 positioned at selected points serve as a track-way so that an implement such as shown in dotted lines and indicated by the numeral 56 can be wheeled and raised to rest on the pair of rail members 22.

A pair of wheels is attached in any suitable location by any suitable means to the forward end of the device. The wheels 58 of the implement 60 rest upon and between the pair of side members 22.

It will thus be seen that the device may be employed manually for moving implements in and out of a storage shed. However, its principal intended use is in the capacity of a trailer to be fastened to the rear bumper guard of a truck, a tractor or other motor vehicle.

It will thus be seen also that an elongated vehicle is provided which has a low-slung frame suspended beneath the axle of the wheels. The frame is of sufficient width and narrow enough so that the wheels of a farm implement may be supported thereon and therebetween. It is low enough so that a farm implement could conceivably be lifted on to it without the use of a ramp. A ramp is provided for expediting the raising and placing of the implement upon the frame.

It will thus also be seen further that the height of the forward end can be regulated to accommodate different heights of rear bumpers to which the trailer may be attached. A convenient means is provided for this purpose in the threaded post.

It will be seen further that ease in storing farm implements and ease in removing them from storage has been achieved since in a shed or barn or storage space when a number of implements are stored by means of this device they can easily be moved about within the space of storage.

From the foregoing description, it is thought to be obvious that an implement trailer constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In an implement trailer a pair of rear wheels, an axle connecting said wheels and journaled for rotation in a stationary elongated block, a chassis comprising a low slung frame suspended beneath the axle of said wheels, said frame comprising two side angle members, two end angle members and two intermediately placed brace members, a pair of supporting members for said frame, each comprising a strap member engaging and supported at its upper end on said stationary elongated block and attached at its lower end to the horizontal portion of the said angle members, means on the forward end of said frame for attachment to the rearward bumper of an automotive vehicle, said means being adjustable vertically so that the height of the forward end may be regulated to the height of the bumper to which it is attached, a pair of plates adapted for engagement over said side angle irons at selected positions and forming ramps, said plates forming a ramp for expediting the placement of a farm implement upon the frame.

2. An implement carrying trailer comprising a normally horizontally extending elongated frame, said trailer frame having a carrying portion at least three times as long as the trailer width and said trailer being open above said carrying portion for receiving thereon wheeled farm implements having widely spaced wheels transversely spaced apart corresponding distances, the long carrying portion being so that such an implement can be carried on the trailer with its side wheels disposed fore and aft, wheels attached to and supporting one end of said trailer, and means for attaching the other end of the trailer to a motor vehicle.

3. The combination described in claim 2 in which said trailer frame is disposed spaced a substantial distance below the hubs of said trailer wheels.

4. The combination described in claim 2 in which said frame has two side members extending forwardly and rearwardly with the space between said side members substantially open for receiving wheels of said implement in positions extending somewhat down between said side members while being supported by said side members, two ramp members are provided for placement in positions extending from the top of a side of said frame downwardly to the ground, said ramp members each having at least one hooked upper end portion for hooking over the upper sides of a desired side member of said frame.

5. The trailer of claim 2 in which said frame has forwardly and rearwardly extending portions extending upward on each side thereof and has horizontal portions therebetween whereby said horizontal portions support the wheels of implement and said upwardly extending portions prevent said implement from rolling off the sides of said trailer.

6. The trailer of claim 2 in which said frame has forwardly and rearwardly extending substantial distances portions extending upward on each side thereof and has horizontal portions therebetween whereby said horizontal portions support the wheels of said implement and said upwardly extending portions prevent said implement from rolling off the sides of said trailer and do so without adjustment for implements of greatly varying tread.

7. The trailer of claim 2 in which a screw jack means is attached to the forward end of the trailer, the screw jack means having a lower end which can be screwed against the ground to cause the forward end of the trailer to raise to a position convenient for hitching the trailer to a motor vehicle.

References Cited in the file of this patent

UNITED STATES PATENTS

| | | |
|---|---|---|
| 306,997 | Barnes | Oct. 21, 1884 |
| 1,479,612 | Joyner | Jan. 1, 1924 |
| 1,482,105 | Andrews et al. | Jan. 29, 1924 |
| 1,775,297 | Towner | Sept. 9, 1930 |
| 2,647,647 | Alimanestiano | Aug. 4, 1953 |
| 2,650,731 | Adler | Sept. 1, 1953 |